United States Patent
Joos et al.

(10) Patent No.: US 6,725,835 B2
(45) Date of Patent: Apr. 27, 2004

(54) METHOD FOR OPERATING AN OTTO-CYCLE INTERNAL COMBUSTION ENGINE WITH FUEL INJECTION ON A COLD START

(75) Inventors: Klaus Joos, Walheim (DE); Ralf Daeubel, Markgroeningen (DE); Gerd Grass, Schwieberdingen (DE); Ruediger Weiss, Moetzingen (DE); Hansjoerg Bochum, Leinfelden (DE); Edmund Schaut, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,333

(22) PCT Filed: Dec. 27, 2000

(86) PCT No.: PCT/DE00/04633

§ 371 (c)(1),
(2), (4) Date: Sep. 16, 2002

(87) PCT Pub. No.: WO01/50015

PCT Pub. Date: Jul. 12, 2001

(65) Prior Publication Data

US 2003/0075152 A1 Apr. 24, 2003

(30) Foreign Application Priority Data

Dec. 31, 1999 (DE) .......................................... 199 63 914

(51) Int. Cl.$^7$ ................................................. F02P 5/00
(52) U.S. Cl. .................................. 123/406.53; 123/491
(58) Field of Search ............................ 123/406.53, 491, 123/436, 406.54, 406.55; 60/285

(56) References Cited

U.S. PATENT DOCUMENTS

| 4,982,712 A | 1/1991 | Abe ............................ 123/424 |
| 5,050,551 A | 9/1991 | Morikawa ..................... 123/305 |
| 5,357,928 A | 10/1994 | Ohtsuka ...................... 123/491 |
| 5,497,745 A | 3/1996 | Cullen et al. ........... 123/339.11 |
| 5,655,365 A * | 8/1997 | Worth et al. ................... 60/285 |
| 6,266,957 B1 * | 7/2001 | Nozawa et al. ............... 60/284 |
| 6,513,319 B2 * | 2/2003 | Nozawa et al. ............... 60/284 |

FOREIGN PATENT DOCUMENTS

JP    11 280532    9/1999

OTHER PUBLICATIONS

Patent Abstracts of Japan, vol. 2000, No. 01, Jan. 31, 2000.

* cited by examiner

Primary Examiner—Mahmoud Gimie
Assistant Examiner—Hai Huynh
(74) Attorney, Agent, or Firm—Kenyon & Kenyon

(57) ABSTRACT

A method is provided for operating a spark ignition internal combustion engine having fuel injection at a cold start. The method retards the spark angle to a cold start value at least for the first combustion in at least one cylinder of the internal combustion engine during a cold start phase, the fuel injected into the cylinder being brought to combustion, and the method sets the spark angle to normal, to end the cold start phase.

8 Claims, 1 Drawing Sheet

METHOD FOR OPERATING AN OTTO-CYCLE INTERNAL COMBUSTION ENGINE WITH FUEL INJECTION ON A COLD START

FIELD OF THE INVENTION

The present invention relates to a method of operating a spark ignition internal combustion engine having fuel injection at a cold start.

BACKGROUND INFORMATION

To start a spark ignition internal combustion engine having direct fuel injection, an initial pressure of, for example, about 4 bar, may be created using an electrical fuel pump. The fuel injection may be limited by an angle window, the beginning of which may be defined by the moment of opening of an inlet valve and the end of which may be determined by the combustion chamber pressure established in the cylinder. Since the pressure in the combustion chamber rises during a compression phase and exceeds the initial pressure created by the electrical fuel pump starting at a certain piston position, the fuel injection should end when the pressure in the combustion chamber exceeds a certain pressure threshold. Otherwise, air may be blown from the combustion chamber into the inlet valve, which may cause this air, instead of fuel, to be injected through the inlet valve into the combustion chamber during a subsequent injection. This may disadvantageously cause combustion misfiring in the corresponding cylinders.

Consequently, the beginning and the end of a fuel injection, which is limited by an angle window, are determined by a certain rotational angle position of the crankshaft, the respective rotational angle positions at the beginning and end of the injection enclosing a corresponding variable angle of rotation of the crankshaft. The time interval during which the crankshaft passes through this angle of rotation is proportional to the rotational speed of the engine.

When the internal combustion engine is cold-started, very long injection times may be required, at least for initial combustions. When the fuel injection times are long, the fuel reaching the combustion chamber from the first two injections may combust and cause a significant increase in rotational speed. Due to the increase in rotational speed, there may not be sufficient injection time available for the subsequent third and fourth injections to inject an adequate quantity of fuel for combustion into the combustion chamber using the inlet valve (injection valve). This may cause unwanted combustion misfirings during the third and fourth injections at cold start.

To avoid these unwanted combustion misfirings during the cold start, an additional injector (cold start injector), which may be positioned in the intake pipe of the engine, injects additional fuel into the injection chamber simultaneously with the intake valve during the cold start. However, it is believed that such an additional cold start valve may be relatively complicated and costly.

SUMMARY OF THE INVENTION

An exemplary method according to the present invention for operating a spark ignition internal combustion engine having fuel injection at a cold start includes the following steps:

retarding the spark angle to a cold start value for at least the first combustion in at least one cylinder of the internal combustion engine during a cold start phase, while the fuel injected into the cylinder is brought to combustion; and setting the spark angle to normal to end the cold start phase.

Since the spark angle is retarded as much as possible for at least the first combustion in at least one cylinder, the fuel or fuel-air mixture injected into the combustion chamber is burned up in the corresponding ignition, and as such, a small torque is produced by this combustion.

Consequently, the first combustion, using a retarded spark angle, results in a slight increase in rotational speed, so that there may be sufficient injection time available for the next injection to inject sufficient fuel into the combustion chamber, so that reliable combustion may be ensured, or at least made more probable. Further, since the combustion chamber warms up after the first combustion, less fuel may be injected into the combustion chamber to ensure a next combustion. Thus, a retarding of the spark angle for at least the first combustion in each respective cylinder during a cold start results in warming of the combustion chamber, while the increase in rotational speed of the engine is reduced. In this manner, successful combustion for the next injection is ensured, or at least made more probable, since less injected fuel may be required for the following combustion, due to the warming of the combustion chamber by the first combustion, while at the same time more injection time may be available for injecting fuel into the (warmed) combustion chamber due to the relatively slight increase in rotational speed. Thus, combustion misfirings during cold start may be prevented, or at least reduced, in a simple and reliable way.

The cold start phase may include a plurality of combustions. Due to the low increase in rotational speed during the first combustions with a late spark angle, the retardation of the spark angle is not limited to the first combustion during the cold start, but may be extended to a desired optimal number of combustions to achieve effective warming of the combustion chamber and to optimize additional cold start parameters.

The spark angle is reset to normal in a single step, to set a desired operating performance value. This permits a quick change from retarded spark angles to appropriate normal spark angles after the cold start phase ends, at which an elevated or maximum possible spark angle operating efficiency may be achieved.

The spark angle is reset to normal in a plurality of transitional steps, to set a desired operating performance value. To avoid too great a change in the spark angle, the reset to normal, which ends the cold start phase, may occur in several transitional steps, until the desired normal spark angle is set to utilize maximum possible spark angle operating efficiency.

According to an exemplary embodiment of the present invention, the cold start value is individually set for each cylinder. Since the cold starting response of the various cylinders of an internal combustion engine may differ, a cold start value for each individual cylinder may be calculated and set, to ensure effective prevention of combustion misfirings, while at the same time maintaining the maximum possible spark angle efficiency.

The cold start value may be set during the cold start phase for the next combustion of each corresponding cylinder. Since increased warming of the combustion chamber is achieved during the cold start phase with each combustion, a specific cold start value for each individual cylinder for each individual combustion may be calculated and set. In this manner, the retardation of the spark angle during the cold start phase is kept as small as possible, so that an optimized spark angle operating efficiency may be attained, even during the cold start phase.

The cold start value is set using a retardation setting that is adapted to the operating temperature of a particular cylinder. In this manner, the cold start value of the spark angle may be kept at the lowest level possible, to achieve optimal spark angle operating efficiency, while reliably preventing combustion misfirings during the cold start phase.

The spark angle is retarded if the number of ignitions is smaller than or equal to the value of a parameter, which is greater than or equal to one and less than or equal to the number of cylinders in the engine, and the combustion chamber temperature before the first ignition is lower than a threshold temperature. This permits the retardation during the cold start phase to be limited to a defined number of ignitions, for example, alternative polling. The combustion chamber temperature before the first ignition may be at least approximately determined from the coolant temperature, the oil temperature and/or the intake air temperature of the engine. The temperature threshold may be, for example, approximately 0° C.

BRIEF DESCRIPTION OF THE DRAWINGS

The FIGURE is a block diagram of a cold start spark angle adjustment.

DETAILED DESCRIPTION

Figure 1:
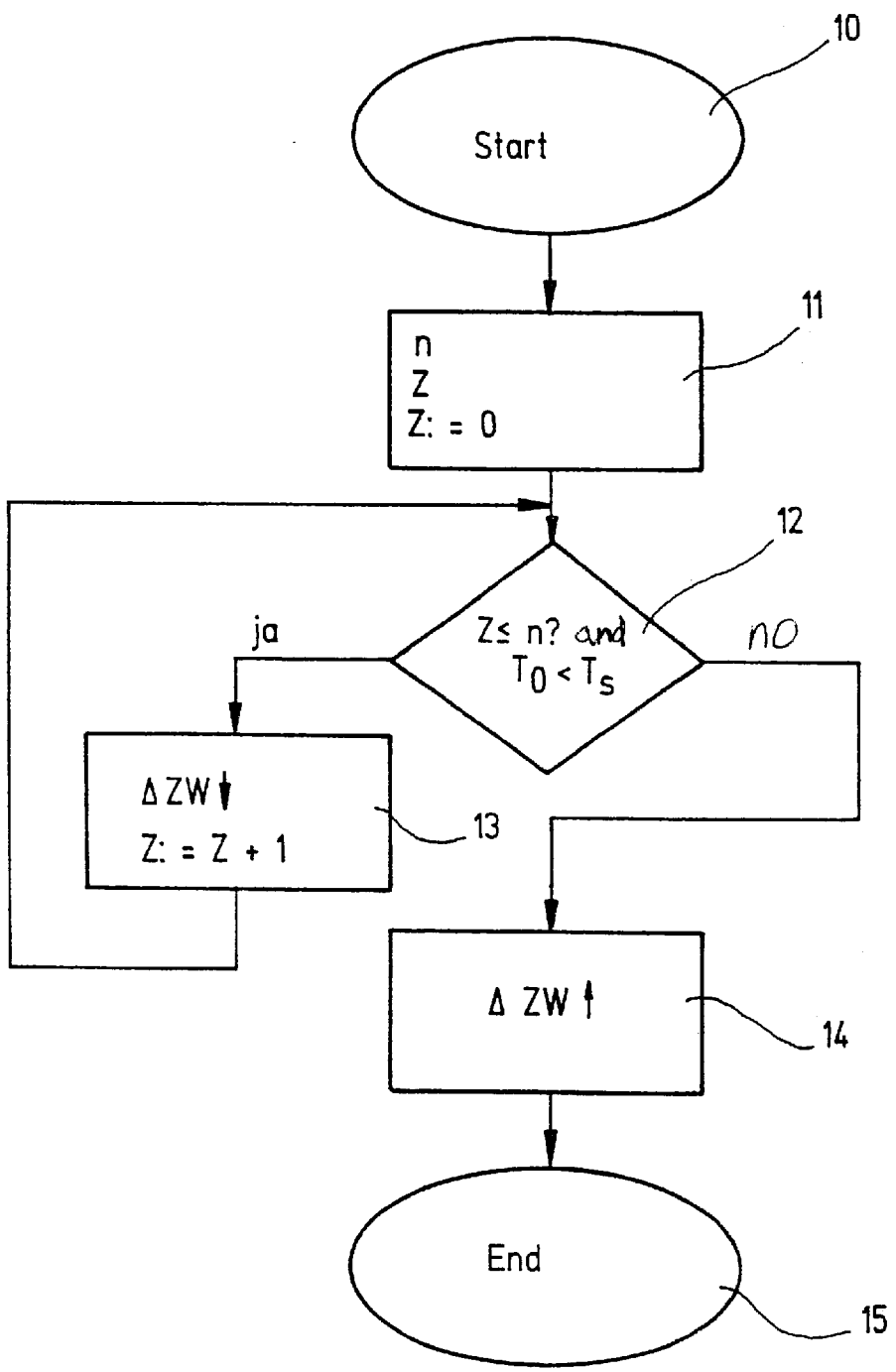

The FIGURE is a block diagram of a cold start spark angle adjustment, in which the following definitions apply:

Block 10=start of the cold start spark angle adjustment;

Block 11=parameter acquisition with the parameters
n=freely applicable number where $1 \leq n \leq$ number of cylinders,
z=number of ignitions;

Block 12=alternative polling;

Block 13=spark angle retardation $\Delta ZW \downarrow$;

Block 14=spark angle normal setting $\Delta ZW \uparrow$;

Block 15=end of the cold start spark angle adjustment.

When the internal combustion engine is started (Block 10), the cold start spark angle adjustment is started automatically. The freely applicable number designated as n (for example $1 \leq n \leq$ number of cylinders in the engine) and the number of ignitions designated as z are defined as parameters (Block 11). These parameters n and z are suitably determined. Before the first ignition, z has the value 0. When the engine is cold started, an automatic alternative polling (Block 12) determines whether the number of ignitions z is smaller than or equal to the number of cylinders n in the engine ($z \leq n$?), and whether, at the same time, the combustion chamber temperature in the cylinder before the first ignition is lower than a temperature threshold Ts (To$\leq$Ts?). If so (i.e., if both conditions are fulfilled at the same time and the alternative polling is answered with yes), spark angle retardation (Block 13) is activated for the next ignition z+1. The alternative polling (12) is continued until the number of ignitions z is greater than the number of the parameter n. Starting from this moment in the operation, the alternative polling (Block 12) is thus answered with no, so that the spark angle retardation, which was activated up to this point (Block 13 with $z \leq n$), is canceled by an appropriate advancement of the spark angle (Block 14). After this setting of the spark angle to normal (Block 14), the cold start angle adjustment is ended (Block 15).

In the exemplary embodiment described with reference to the FIGURE, the retardation of the spark angle is set to a cold start value for a number of ignitions z, which corresponds to the number of the parameter n. This spark angle retardation guarantees, or at least makes more probable, that the fuel or fuel-air mixture injected into the cylinder throughout the entire cold start phase is brought to combustion. Since the spark angle is retarded for the initial combustions, little or no torque is produced during the cold start, so that the increase in rotational speed is slight. As a result, a relatively long time may be available for all injections during the cold start phase, and, for example, for the second through the last injections (z>1 to z=n), to enable a sufficient quantity of fuel or fuel-air mixture for successful combustion to be injected into the respective cylinder. Thus, by retarding the spark angle, combustion misfirings during the cold start phase may be reliably prevented or reduced.

Furthermore, the initial combustions in the respective cylinder produce a warming of the combustion chamber, for which reason the fuel or fuel-air mixture required to be injected into the respective cylinder to permit reliable combustion is reduced compared to a colder combustion chamber for the next ignition, so that the spark angle requires less retardation with increasing warming of the combustion chamber, due to the initial combustions during a cold start phase, to guarantee, or at least make more probable, successful combustion of the injected fuel or fuel-air mixture throughout the entire cold start phase. In this manner, the spark angle operating efficiency may be optimized during the cold start phase of an internal combustion engine, since, for each ignition in the cold start phase, the spark angle is retarded only as required for successful combustion at the time of all ignitions. This may prevent combustion misses.

After a certain, individually adjustable number of ignitions z, the spark angle is set to normal, to limit the cold start phase to as few ignitions as possible and thus to operate the internal combustion engine at high spark angle operating efficiency with the largest possible spark angles (advanced ignition point) as quickly as possible. The spark angle retardation should apply to the first ignition during cold starting of a cylinder of the engine, to keep the duration of the start as short as possible. A plurality of transitional steps may increase spark angle advancement in the transition from the spark angle retardation to the normal spark angle setting. The optimum retarded spark angle value (cold start value) may be calculated and individually set for each cylinder of the internal combustion engine.

What is claimed is:

1. A method of operating a spark ignition engine having at least one cylinder and a cold start phase, the method comprising:

injecting a quantity of fuel into the at least one cylinder in the cold start phase, so that a time available for the injection of the quantity of fuel is insufficient at an elevated rotational speed of the spark ignition engine, wherein the cold start phase includes at least the first combustion upon start of the engine;

retarding a spark angle in the cold start phase, so that a rotational speed of the spark ignition engine remains limited to a cold start value that is sufficient for the injection of the quantity of fuel during the cold start phase; and setting the spark angle to normal after the cold start phase.

2. The method of claim 1, wherein the cold start phase includes at least the first two combustions upon start of the engine.

3. The method of claim 1, wherein the spark angle is set to normal in a single step to set a desired operating performance value.

4. The method of claim 1, wherein the spark angle is set to normal in a plurality of transitional steps to set a desired operating performance value.

5. The method of claim 1, wherein the cold start value is individually set for each of the at least one cylinder.

6. The method of claim 1, wherein the cold start value is individually set during the cold start phase for a next combustion of a respective one of the at least one cylinder.

7. The method of claim 1, wherein the cold start value is set using a retardation adjusted to an operating temperature of a respective one of the at least one cylinder.

8. The method of claim 7, wherein the retardation occurs if a number of ignitions is no greater than a value of a parameter, and a combustion chamber temperature before a first ignition is lower than a threshold temperature at a same time, the parameter being at least one and no greater than a number of cylinders of the at least one cylinder.

* * * * *